United States Patent [19]

Nielsen et al.

[11] 4,358,420
[45] Nov. 9, 1982

[54] METHOD OF MAKING A THIN WALL CENTRIFUGE TUBE WITH IMPROVED POLYMER PROPERTIES

[75] Inventors: Steven T. Nielsen, Sunnyvale; Robert S. Carey, Portola Valley, both of Calif.

[73] Assignee: Beckman Instruments, Inc., Fullerton, Calif.

[21] Appl. No.: 267,188

[22] Filed: May 26, 1981

Related U.S. Application Data

[63] Continuation-in-part of Ser. No. 93,330, Nov. 13, 1979, abandoned.

[51] Int. Cl.³ .............................................. B29C 17/07
[52] U.S. Cl. ................................... 264/538; 264/537; 425/525; 425/533
[58] Field of Search .................... 264/523, 537, 538; 425/522, 525, 533

[56] References Cited

U.S. PATENT DOCUMENTS

| | | | |
|---|---|---|---|
| 2,262,612 | 11/1941 | Kopitke | 264/537 |
| 2,331,702 | 10/1943 | Kopitke | 264/537 |
| 2,853,736 | 9/1958 | Gussoni | 18/5 |
| 3,011,216 | 12/1961 | Gussoni | 18/55 |
| 3,137,748 | 6/1964 | Makowski | 264/97 |
| 3,337,666 | 8/1967 | Wilkins | 425/533 X |
| 3,608,268 | 9/1971 | Lauritzen | 264/525 X |
| 3,832,101 | 8/1974 | Rainville | 425/242 B |
| 4,018,860 | 4/1977 | Farrell | 264/39 |
| 4,054,630 | 10/1977 | Wang | 264/537 X |
| 4,083,903 | 4/1978 | Gilbert et al. | 264/537 X |

*Primary Examiner*—Jan H. Silbaugh
*Attorney, Agent, or Firm*—R. J. Steinmeyer; F. L. Mehlhoff; William H. May

[57] ABSTRACT

A method for making a thin wall centrifuge tube using an injection blow molded process to achieve not only uniform thickness of the tube, but also uniform or homogeneous material properties throughout the tube structure. The unique application of this process includes the making of a preform mold which retains its molten stage on a transferrable core pin that is received at a second stage, where the final configuration mold is placed around the core pin. The blow molding stage operates in conjunction with the molten preform to create the high strength centrifuge tube with uniform material properties.

1 Claim, 11 Drawing Figures

METHOD OF MAKING A THIN WALL CENTRIFUGE TUBE WITH IMPROVED POLYMER PROPERTIES

RELATED APPLICATION

This application is a continuation-in-part application from Ser. No. 093,330, filed Nov. 13, 1979 now abandoned.

BACKGROUND OF THE INVENTION

The present invention is directed to a method for making a centrifuge tube and, more particularly, is directed to a unique approach for making thin wall centrifuge tubes having an improved polymer structure to provide desirable structural advantages.

Although present methods for making centrifuge tubes have been generally satisfactory, the need for making better centrifuge tubes with greater integrity becomes more acute as the sophistication of centrifugation, especially ultracentrifugation, increases. The stresses which are now placed upon centrifuge tubes in the ultracentrifugation field are extreme, requiring the properties of the centrifuge tube to be as nearly perfect as possible.

A typical present method for the manufacture of thin wall centrifuge tubes utilizes the injection molding process which produces a very satisfactory tube, but unfortunately has some undesirable characteristics. One particular disadvantage with respect to injection molded centrifuge tubes is the fact that the thin wall has a non-uniform thickness which is the result of slight movement of the core pin utilized during the process. Very often the centrifuge tube has a thin region extending from the bottom of the tube to the top with the thinnest region near the bottom sidewall. After cooling, the injection molded tube must be removed from the core pin requiring an undesirable slight tapered shape to the centrifuge tube in order to permit extraction from the core pin.

In the injection molding process the mold itself is relatively cold compared to the temperature of the thermoplastic material entering the mold. The injection molded tube, consequently, has a weak region caused by the two moving cold fronts bonding at a thin region called a knit-line. The deflection of the core pin also contributes to the development of the knit-line. Unfortunately, in some circumstances this knit-line is a weak point in the tube and, in some instances, will fail by cracking during high speed centrifugation.

An injection molded tube has a gate region of non-uniform polymer structure at the tube's hemispherical bottom which is caused by the rapidly changing temperatures as the thermoplastic material of high temperature enters through a gate to the relatively cool mold. Also, the shear of the plastic melt, as well as changes in the direction of the plastic flow, adversely affect this gate region on the bottom of the tube.

Because the thin wall tube cavity in the mold is very small and narrow, high injection pressures and speeds are required to move the molten material through the tube mold before the material cools. The material entering the cool mold at high pressure and temperature causes high residual stresses in the tube which, coupled with centrifugally induced forces during centrifugation with the finished tube, may effect the integrity of the tube. The overall mechanical properties of the injection molded centrifuge tube are somewhat affected by the high plastic melt temperature that is required for the molding. In many instances, the tube tends to be somewhat brittle and the tube, although somewhat strong in the axial direction, is weak in the circumferential direction.

In the injection molding process typically there is a longer cycle time required for the mold because of the cooling step of the process which occurs after the injection of material into the mold. The high temperatures and pressures used in the injection molding process for making a thin wall centrifuge tube approach the degradation limit of the polymer by the combined effects of the thermal and sheared degradation.

Another process utilized in the making of thin wall centrifuge tubes is extrusion blow molding, but there are certain inherent characteristics which occur during this process that are not desirable. Thin wall tubes molded by the extrusion below molding process typically may have die marks or striations coincident with the centerline axis of the tube caused by the extrusion process with stretching during the blowing process. In the extrusion blow molded process a pinch-off is required of the extruded cylindrical molten preform for sealing during the blowing process. The pinch-off occurs at the bottom of the centifuge tube and is a potential weak region because of the welding process. Also, there is the requirement that a tail or excess material portion at the bottom of the tube at the pinch-off be removed from an extrusion blow molded tube so that the tube will have a good fit when placed in the centrifuge rotor.

Although some containers, such as decorative bottles, are made using a combination of injection molding and blow molding, this process has not been considered or used for making thin walled centrifuge tubes because this process has been regarded as too unstable with poor thermal uniformity to make an acceptable thin wall configuration. The general rules applied to making bottles with injection blow molding would be violated by making thin wall centrifuge tubes. The final thickness of the bottle configurations made by this process are considerably thicker than the thickness of the preform needed to make a thin wall centrifuge tube. Therefore, the final thickness of the thin wall centrifuge tube is an order of magnitude thinner than the bottle wall thickness. It is a general rule in injection/blow molding that the minimum parison thickness be at least 0.080 inches and the minimum mold core pin diameter be not less than 0.188 inches. The process for making a thin wall centrifuge tube requires the parison thickness as well as the core pin diameter to be considerably less than the above general minimum dimensions. Also, the ratio of the core pin length to the core pin diameter (L/D) should never be more than twelve to one. However, to make a thin wall centrifuge tube, the L/D ratio of the core pin is required to be greater than twelve to one. Consequently, the general known capabilities of injection blow molding taught away from the idea of using the process to make not only very thin walled containers, but also thin walled centrifuge tubes that must be perfectly made to withstand the extremely high centrifugally induced forces.

SUMMARY OF THE INVENTION

The present invention is directed to the unique approach of making a thin wall centrifuge tube with improved inherent structural characteristics for increased integrity of the tube. The present invention utilizes the combination of injection molding with blow molding. It has been discovered in the present invention that this combination of two types of molding techniques can be utilized to provide the desirable thin walled centrifuge tube configuration that is, surprisingly, inherently more uniform in not only dimensions, but also the polymer properties of the thermoplastic material used.

The molding process set forth in the present invention includes the initial formation of a preform molded piece constructed by the injection molding process. The preformed mold maintains its molten state within the preform mold by controlling heat to the mold and core pin. The preform mold in its molten state is transferred to a second station where a blow molding process occurs. The preform is blown to its proper centrifuge tube shape as defined by a blow mold which is positioned around the transferred preform.

The injection blow molding process does not require as high injection pressure and temperature during the injection molding stage, since the preform mold is maintained at a relatively high temperature and the wall thickness of the preform is considerably greater than the final wall thickness of the tube after the blow molding stage. Because there are no significant temperature differences between the injected high temperature thermoplastic material and the preform mold, and because the preform has a larger wall thickness, there is no buildup of high residual stresses as found in injection molding. The non-homogeneous structure of the thin wall tube caused by the non-uniform temperature as found in the injection molding process is essentially eliminated. Furthermore, since the overall preform is being blown to a cylindrical mold approximately the same distance away from the core pin, the overall internal diameter dimensions of the tube are uniform. Also, the tube has a uniform wall thickness. The present invention eliminates the characteristic knit-line which occurs on thin wall tubes that are made by injection molding because the preform member has thicker walls and the preform mold is kept at a higher temperature.

The method for making thin wall centrifuge tubes utilizing the present invention eliminates the establishment of a non-uniform gate region at the introduction point of the thermoplastic material into the mold while the tube is being made. A non-uniform gate area of the centrifuge tube which is typically found at the bottom of an injection molded tube is eliminated in the injection blow molding process wherein the bottom portion of the tube has a uniform polymer structure. Therefore, an injection blow molded tube has no potential weakness and failure region in its lower end. Also, it should be recognized that in the injection blow molding process the gate region during the initial injection step of this process is much larger in size and the shear forces or rates are greatly reduced. Therefore, since the gate region is maintained at a polymer melt temperature above the crystalline melt temperature, molecular rearrangement is possible and, therefore, re-orients to the uniform structure.

DETAILED DESCRIPTION OF THE INVENTION

In order to more fully understand the present invention, which is the application of injection blow molding to make thin wall ultracentrifuge tubes, it is desirable to briefly discuss separately the processes which are combined to provide an injection blow molding process. By understanding the manner in which a thin wall centrifuge tube can be made separately by these processes, the surprising advantages discovered in the present invention of using the injection blow molding process will be more readily apparent.

Figure 1:
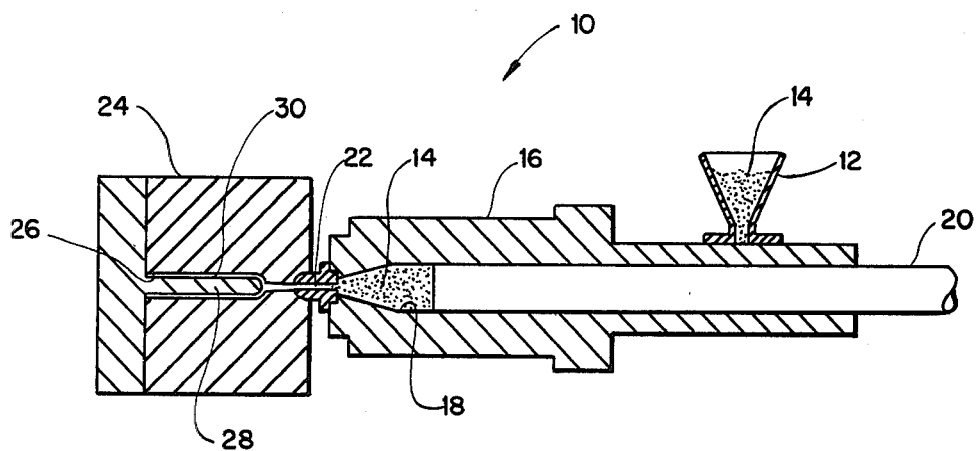
FIG. 1 is a schematic representation of an injection molding process for a centrifuge tube.
Figure 2:
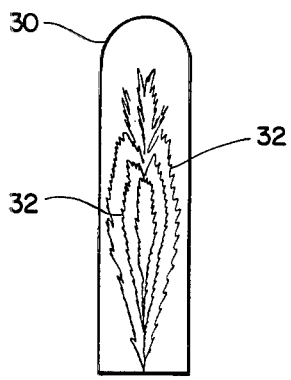
FIG. 2 is a schematic representation of an injection molded centrifuge tube showing a high level of residual stress areas.

Reference is made to FIG. 1 showing a schematic arrangement 10 for an injection molding process. The system 10 incorporates a hopper 12 which contains the thermoplastic material 14 for making the tube. A heating cylinder 16 is provided with an internal channel 18 which receives the thermoplastic material 14 when the ram 20 is retracted. As the ram is advanced in the channel 18, the thermoplastic material 14 within the channel 18 is moved toward the gate area 22 through which the hot thermoplastic material is introduced into the mold 24. The thermoplastic material 14 is forced with high pressure and temperature through the gate 22 into the mold 24, so that the molten thermoplastic material will fill the entire mold cavity 26 which forms the thin wall centrifuge tube 30. Typically, the core pin 28 may deflect slightly and cause the tube to be thinner on one side than the other. Also, since the mold 24 is relatively cool compared to the heating cylinder 16 and the molten material 14, the material will begin to cool as it enters the mold cavity 26 and cause a possible uneven flow in the cavity which will result in a potential knit-line or uneven non-homogeneous arrangement of the polymer structure. The knit-line characteristic of a polymer structure is shown more clearly in FIG. 2, which is a somewhat schematic representation of a photograph taken with the tube 30 positioned between crossed polarized lenses wherein the lined regions 32 represented relative high stresses because of the birefringent phenomenon which is associated with a high level of residual stresses.

Figure 3:
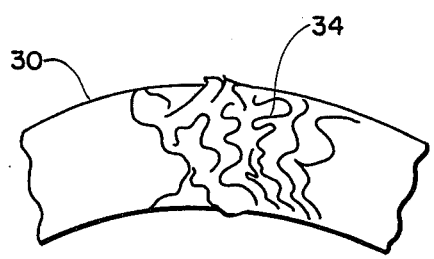
FIG. 3 is a schematic representation of the gate region of an injection molded tube as viewed by a polarizing light microscope.

Furthermore, the cooling down of the material within the mold cavity 26 results in an undesirable gate region at the bottom of the tube which is characterized by a non-uniform structure of amorphous and crystalline regions. This results in a non-homogeneous structure which can cause possible premature fracture during centrifugation. FIG. 3 shows in schematic form the gate region 34 of an injection molded tube 30 shown as approximately 30×, microtomed section in a polarizing light microscope. Also, it should be noted that in order to retract the thin wall centrifuge tube from the core pin 28, it is necessary that there be a slight taper in the tube, resulting in a variation of the internal diameter from the top of the tube to the bottom.

Figure 4:
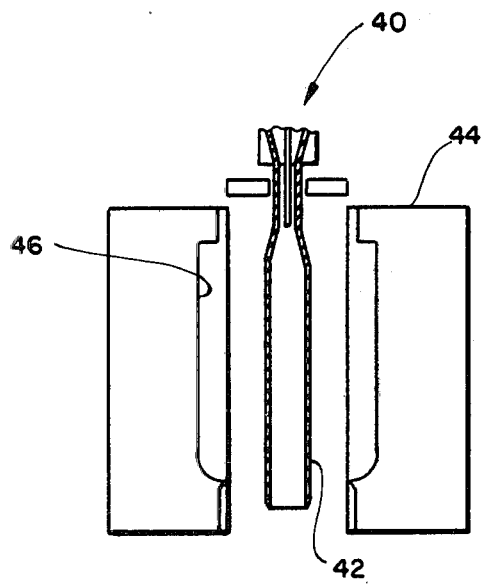
FIG. 4 shows the extrusion step in an extrusion blow molding process in somewhat schematic form.
Figure 5:
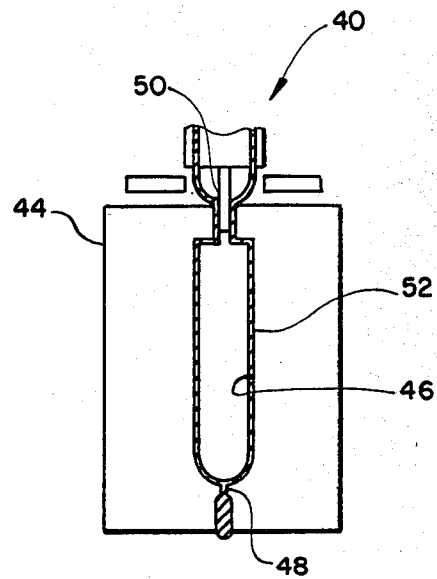
FIG. 5 shows the blow molding step in an extrusion blow molding process in somewhat schematic form.
Figure 6:
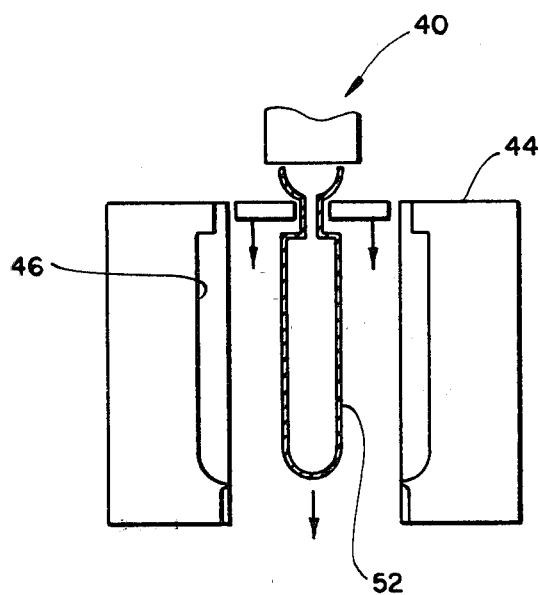
FIG. 6 shows the ejection step in an extrusion blow molding process in somewhat schematic form.

FIGS. 4–6 show somewhat schematically the steps in the extrusion blow molding system 40 to make a thin wall centrifuge tube. In the first stage in FIG. 4 a continuous piece of thermoplastic material 42 is extruded to form essentially a hollow parison or preform that is in essentially a molten tube. Surrounding this cylindrical extrusion of molten material is a blow mold 44 having a cavity 46 defining the final shape of the centrifuge tube being made. The blow mold 44 in FIG. 5 is clamped around the parison 42 and pinches closed the parison at the bottom 48 of the mold while the top of the parison is sealed against a blow pin 50. Air is supplied through the blow pin 50 and the parison is blown into the mold cavity 46 to form the centrifuge tube 52. The blown tube is cooled and, as shown in FIG. 6, the blow mold 44 is separated allowing the ejection of the centrifuge tube 52.

Again, as in the injection molded tube, the extrusion blow molded tube has a gate region which actually represents the pinch-off or welded area where the two surfaces of the polymer melt of the parison tube are mechanically forced together during the process.

Figure 7:
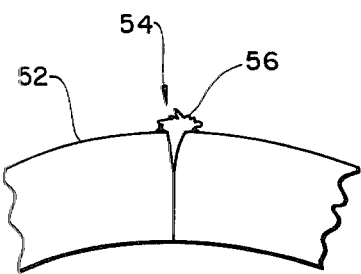
FIG. 7 is a schematic representation of the gate region of an extrusion blow molded tube as viewed by a polarizing light microscope.

FIG. 7 shows in schematic form the gate area 54 of the extrusion blow molded tube 52 which has a pinch-off region which could result in possible premature failure because of this weakness. Also, it is necessary to smooth off the end of the exterior gate portion 56 in order to provide good fit of the tube within the rotor.

Figure 8:
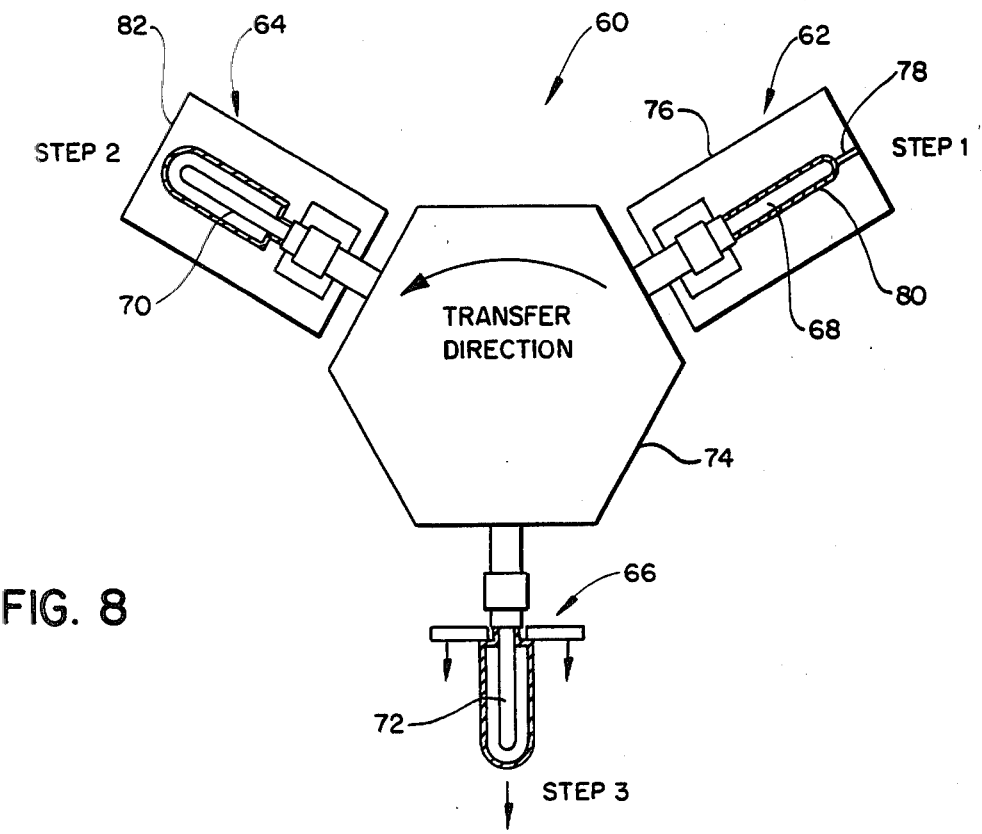
FIG. 8 shows an injection blow molding system in somewhat schematic form with the transfer head in a first position.
Figure 9:
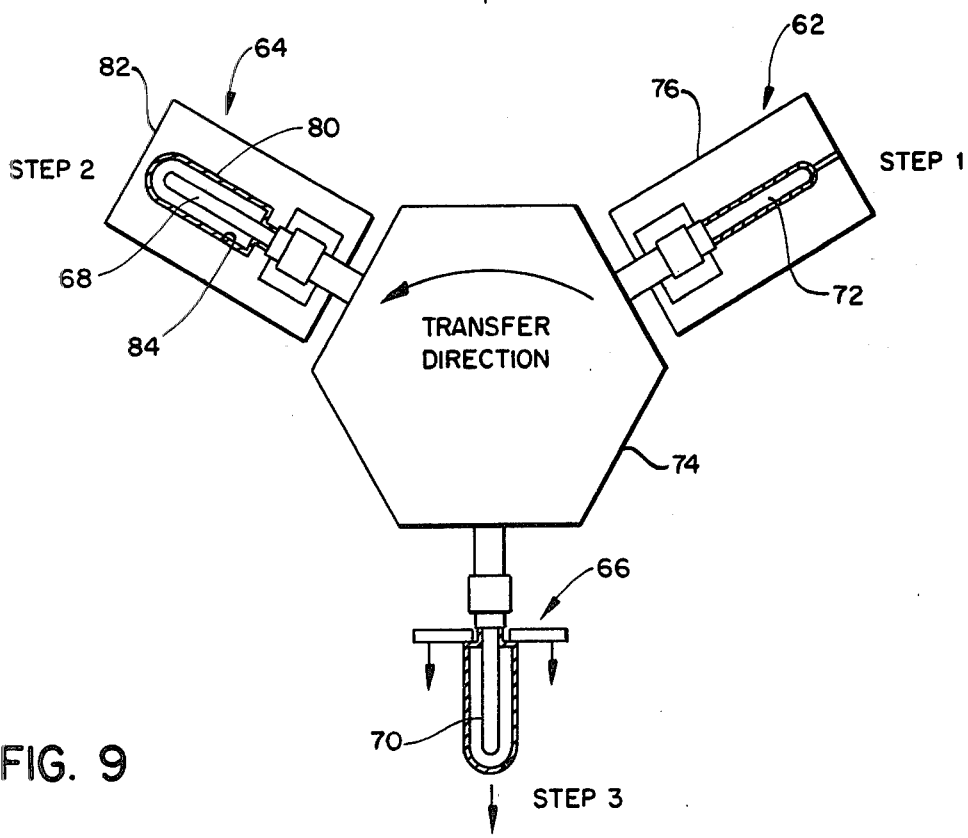
FIG. 9 shows an injection blow molding system in somewhat schematic form with the transfer head in a second position.
Figure 10:
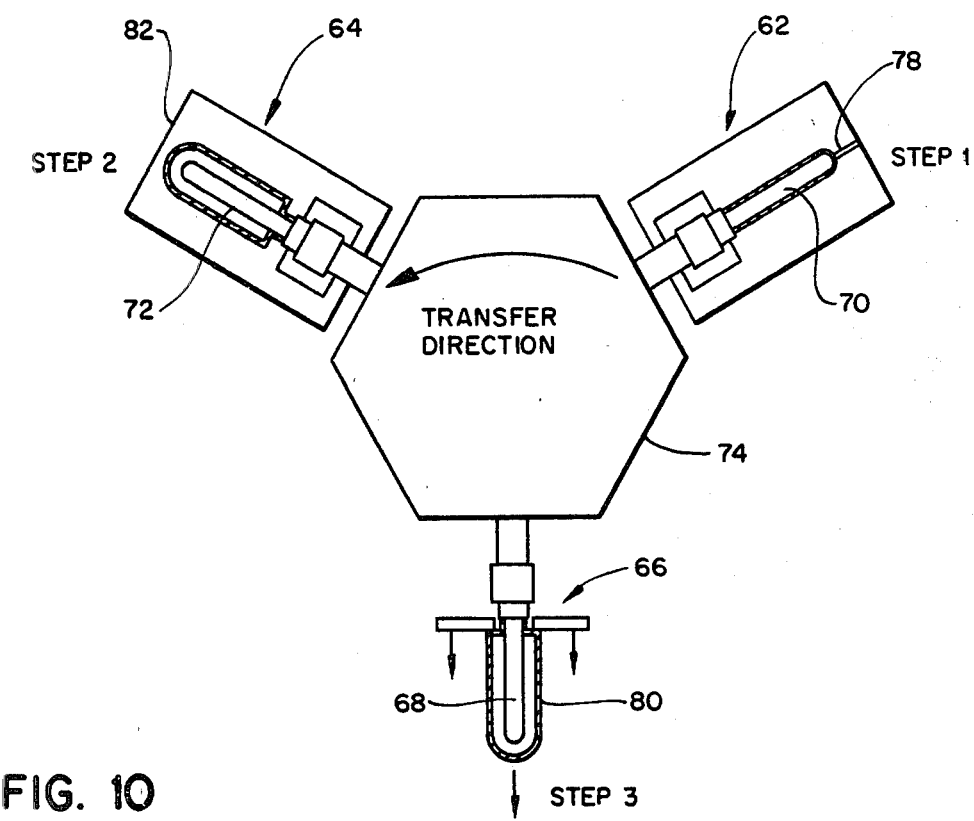
FIG. 10 shows an injection blow molding system in somewhat schematic form with the transfer head in a third position.

FIGS. 8–10 show the present invention 60 comprising a process for making a thin walled centrifuge tube with the injection blow molding process. The system 60 as shown in FIGS. 8–10 has three stations. The first station 62 is the preform mold station, while station 64 is the blow mold station and station 66 is the ejection station. The process of the present invention shown in FIGS. 8–10 is a continuous movement mechanism whereby three core pins 68, 70 and 72 are attached to a rotatable center transfer head 74. Each of the core pins is located at one or the other of the three stations 62, 64 or 66 at any time during the process. The process is continuous, so that the tubes are continually being made and ejected.

In the first stage 62 the core pin 68 is positioned within a preform mold 76 in FIG. 8 to receive through the gate 78 thermoplastic material by an injection molding process. However, both the core pin 68 and the preform mold 76 are maintained at a substantially high temperature, only somewhat lower than the temperature of the molten thermoplastic material entering the preform mold, so that the preform 80 created in the preform station maintains its molten state. The core pin 68 preferably has a length to diameter ratio greater than thirteen to one. For example, a core pin with a twenty to one length to diameter ratio has been used in the present inventive process to make thin walled centrifuge tubes. The preform or parison thickness is preferably less than 0.080 inches.

Once the preform molding step has been completed, the transfer head 74 moves the core pin 68 to the blow mold station 64 as shown in FIG. 9, while the core pin 70 is moved to the ejection station 66 and core pin 72 is moved to the preform mold station 62 to receive its preform mold. At the blow mold station 64 the molten preform 80 carried on the core pin 68 receives the blow mold 82. Each of the core pins have an air valve as a source of air to the interior of the preform 80. Therefore, at the blow mold station 64 low pressure air is introduced from within the core pin 68 to expand the preform 80 out into the blow mold cavity 84 to form the final configuration of the centrifuge tube 80. After the blow mold state has been completed and the blow mold 82 is removed from the centrifuge tube 80, the transfer head 74 is moved again so that core pin 68 is at the ejection station 66 as shown in FIG. 8. When the tube 80 has sufficiently cooled, it is ejected from the core pin 68.

It should be noted with respect to FIGS. 8–10 that the injection blow molding process is designed to be a continuous cycle operation. In other words, as the core pin 68 is moved from the preform mold station 62 in FIG. 8 to the blow mold station 64 in FIG. 9, the core pin 70 simultaneously moves from the blow mold station 64 to the ejection station 66, while the core pin 72 simultaneously moves from the ejection station 66 to the preform mold station 62. Each of the core pins advances to the next station in unison each time the transfer head 74 moves. It is envisioned that the core pin 68 could be stationary in an alternate embodiment with the preform mold 76, blow mold 82 and ejector mechanism 66 sequentially moving into and out of engagement with the core pin 68.

One important aspect of the present invention is that the preform 80 on the core pin 68 is in a molten stage when it transfers to the blow mold station 64. Therefore, because the material is kept in a molten stage, and because the wall thickness of the preform 80 is greater than the final tube configuration, the typical high pressure and temperature required to provide injection molding where the mold is cold is eliminated. Consequently, the molding stresses are relaxed when the preform 80 is moved to the blow mold station 64 and is blown in the final shape with low pressure air. The gate 78 of the preform 80 is made of a larger size than in typical injection molding processes so that the shear rates are reduced. Also, since the material is kept at a high temperature and above the crystalline melt temperature, the molecular re-arrangement is possible so that the gate region re-orients to a uniform structure when removed from the preform mold station. This is shown in schematic form in FIG. 11 where the gate region 86 is more homogeneous in structure for the tube 80.

Figure 11:
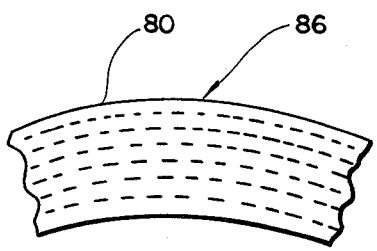
FIG. 11 is a schematic representation of the gate region of an injection blow molded tube as viewed by a polarizing light microscope.

The present invention does not show any die marks or striations which are found in an extrusion blow molding process caused by the stretching of the molten tubular member. Furthermore, the present invention does not require the pinch-off of the extruded cylindrical molten preform for sealing as is required in the extrusion blow molding process. Tubes made by the extrusion blow molded process require the removal of the gate tail 56 at the bottom region 54 of the tube 52 as shown in FIG. 7, since it may have an excess flash and may affect the tube fit in the centrifuge rotor. Injection blow molded process does not have such an extension on the bottom of the tube as shown in FIG. 11 and does not, therefore, require the additional problem of cutting away the bottom gate portion.

The utilization of the injection blow molded process provides for the making of thin walled centrifuge tubes having a cylindrical configuration with a wall thickness of 0.010 inches/0.025 inches with a hemispherical bottom and an open top. This process surprisingly allows for an improved uniform polymer morphological structure throughout the tube, including the bottom or the hemispherical end. Also, there is no presence of a knit-line effect defect which may present some potential failure problems during high speed centrifugation. The process also eliminates the high residual stresses which contribute to the elimination of the knit-line. The gate structure area is greatly improved, so that it is essentially a homogeneous bottom portion.

What is claimed is:

1. A method for making a thin wall centrifuge tube capable of withstanding the extreme stresses associated with use in an ultracentrifuge, said method comprising the steps of:

positioning a core pin having a diameter of less than 0.188 inches and a length of diameter ratio greater than thirteen to one at a preform mold station;

placing a preform mold around a central core pin to establish a preform cavity;

injecting a thermoplastic material into said preform cavity to make a molten preform having a thickness of less than 0.080 inches;

heating said preform mold and said core pin to maintain said preform mold in a molten state;

removing said preform mold;

placing a blow mold around said preform and said core pin;

introducing air within said preform;

blowing said preform material into the cavity of said blow mold;

creating a centrifuge tube having a uniform thickness of approximately 0.010 inches to 0.025 inches;

removing said blow mold; and ejecting said tube from said core pin.

* * * * *

UNITED STATES PATENT AND TRADEMARK OFFICE
CERTIFICATE OF CORRECTION

PATENT NO. : 4,358,420
DATED : November 9, 1982
INVENTOR(S) : Nielsen et al.

It is certified that error appears in the above-identified patent and that said Letters Patent are hereby corrected as shown below:

Column 8, line 4, delete "of" and insert --to--.

Signed and Sealed this

Nineteenth Day of July 1983

[SEAL]

Attest:

GERALD J. MOSSINGHOFF

Attesting Officer   Commissioner of Patents and Trademarks